United States Patent
Wu et al.

(10) Patent No.: US 11,934,292 B2
(45) Date of Patent: Mar. 19, 2024

(54) SAMPLING OBJECT DETERMINATION METHOD, ELECTRONIC DEVICE, AND COMPUTER-READABLE STORAGE MEDIUM

(71) Applicant: BAIDU ONLINE NETWORK TECHNOLOGY (BEIJING) CO., LTD., Beijing (CN)

(72) Inventors: Pengfei Wu, Beijing (CN); Hanmeng Liu, Beijing (CN); Dong Wang, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 17/435,291

(22) PCT Filed: May 10, 2021

(86) PCT No.: PCT/CN2021/092643
§ 371 (c)(1),
(2) Date: Aug. 31, 2021

(87) PCT Pub. No.: WO2022/095395
PCT Pub. Date: May 12, 2022

(65) Prior Publication Data
US 2023/0267065 A1  Aug. 24, 2023

(30) Foreign Application Priority Data
Nov. 9, 2020 (CN) .......................... 202011240584.1

(51) Int. Cl.
*G06F 11/34* (2006.01)

(52) U.S. Cl.
CPC ...... *G06F 11/3495* (2013.01); *G06F 11/3409* (2013.01); *G06F 11/3452* (2013.01)

(58) Field of Classification Search
None
See application file for complete search history.

(56) References Cited

U.S. PATENT DOCUMENTS

| 8,990,637 B1 | 3/2015 | Vlachogiannis et al. |
| 9,483,393 B1 | 11/2016 | Suttle et al. |

(Continued)

FOREIGN PATENT DOCUMENTS

| CN | 104838405 A | 8/2015 |
| CN | 109558382 A | 4/2019 |

(Continued)

OTHER PUBLICATIONS

Supplementary European Search Report and European Search Opinion dated Jul. 8, 2022, for Application No. 21762993.0.

(Continued)

*Primary Examiner* — Qing Chen
(74) *Attorney, Agent, or Firm* — KDW Firm PLLC (57) ABSTRACT

Provided are a sampling object determination method and apparatus, an electronic device, and a computer-readable storage medium. The sampling object determination method includes: determining a sampling number through a sampling proportion and a total number of users of an application; determining at least one version in order of versions of the application from high to low, where a sum of a number of users of the at least one version is greater than or equal to the sampling number; and determining the sampling number of users in the users of the at least one version as sampling objects.

18 Claims, 3 Drawing Sheets

(56) References Cited

U.S. PATENT DOCUMENTS

| | | | |
|---|---|---|---|
| 2008/0168433 A1 | 7/2008 | Arnold et al. | |
| 2016/0124839 A1 | 5/2016 | Mordo et al. | |
| 2018/0300376 A1* | 10/2018 | Yin | G06Q 10/00 |
| 2019/0325351 A1* | 10/2019 | Stein | G06F 16/955 |
| 2020/0019400 A1 | 1/2020 | Zhao et al. | |

FOREIGN PATENT DOCUMENTS

| | | |
|---|---|---|
| CN | 110276514 A | 9/2019 |
| CN | 110377521 A | 10/2019 |
| CN | 110941447 A | 3/2020 |
| CN | 111309614 A | 6/2020 |
| CN | 112306836 A | 2/2021 |

OTHER PUBLICATIONS

International Search Report for the International Patent Application No. PCT/CN2021/092643, dated Jun. 23, 2021, 5 pages.
Office Action for the Chinese Patent Application No. 2020112405841, dated Jan. 25, 2022, 10 pages.
Search Report for the Chinese Patent Application No. 2020112405841, dated Jan. 25, 2022, 5 pages.

* cited by examiner

SAMPLING OBJECT DETERMINATION METHOD, ELECTRONIC DEVICE, AND COMPUTER-READABLE STORAGE MEDIUM

CROSS-REFERENCE TO RELATED APPLICATIONS

This is a National Stage Application, filed under 35 U.S.C. 371, of International Patent Application No. PCT/CN2021/092643, filed on May 10, 2021, which claims priority to Chinese Patent Application No. 202011240584.1 filed with the CNIPA on Nov. 9, 2020, the disclosures of which are incorporated herein by reference in their entireties.

TECHNICAL FIELD

The present disclosure relates to mobile communication technologies, for example, a sampling object determination method, an electronic device, and a computer-readable storage medium. The present disclosure is applicable to the field of application performance evaluation.

BACKGROUND

Mobile applications are an important part in the field of mobile communication technologies. Mobile applications have the characteristics of frequent release of new versions and coexistence of multiple versions. In order to evaluate the performance of mobile applications, such as the latest version of mobile applications, it is necessary to perform data analysis on the released "latest version" of a mobile application after each new version for the mobile application is released, so as to accurately evaluate the overall performance, experience and other product effects of this "latest version". These product effects may include, for example, the startup success rate of a mobile application, the startup speed of a mobile application, the white screen rate caused by a mobile application, and the rendering success rate of a mobile application.

However, in the field of mobile communication technologies, after the new version of a mobile application is released, the mobile application is updated in different orders for different operating systems and different models of mobile devices. For example, high-end devices among mobile devices installed with an Android operating system usually update the mobile application first, while low-end devices among mobile devices installed with an Apple operating system for a mobile device usually update the mobile application first. The performance of high-end devices is better than that of low-end devices. Therefore, the data performance of mobile devices installed with the Android operating system is good at the beginning and then bad, and the data performance of mobile devices installed with the Apple operating system for a mobile device is bad at the beginning and then good, which will cause great fluctuations in statistics, thus bringing great challenges to the accuracy of the overall effect evaluation of the "latest version" of the mobile application.

SUMMARY

According to embodiments of the present disclosure, a sampling object determination method, an electronic device, and a computer-readable storage medium are provided.

The sampling object determination method is provided and includes steps described below. A sampling number is determined through a sampling proportion and a total number of users of an application; at least one version is determined in order of versions of the application from high to low, where a sum of a number of users of the at least one version is greater than or equal to the sampling number; and the sampling number of users in the users of the at least one version are determined as sampling objects.

The electronic device is provided and includes at least one processor and a memory communicatively connected to the at least one processor. The memory stores an instruction executable by the at least one processor, and the instruction is executed by the at least one processor to cause the at least one processor to implement the method according to embodiments of the present disclosure.

The non-transitory computer-readable storage medium storing a computer instruction is provided. The computer instruction is configured to cause a computer to implement the preceding method.

The content described in this part is neither intended to define key or important features of embodiments of the present disclosure nor intended to limit the scope of the present disclosure. Other features of the present disclosure are apparent from the description provided hereinafter.

BRIEF DESCRIPTION OF DRAWINGS

In the example embodiments of the present disclosure, the same reference numerals typically indicate the same components. The drawings are intended to provide a better understanding of the present solution and not to limit the present disclosure. In the drawings.

In multiple drawings, the same or corresponding reference numerals indicate the same or corresponding parts.

DETAILED DESCRIPTION

Embodiments of the present disclosure will be described below with reference to the drawings. The drawings illustrate the embodiments of the present disclosure, but it should be understood that the present disclosure may be implemented in various manners and should not be limited to the embodiments set forth herein. These embodiments are provided to make the present disclosure more thorough and complete and to fully convey the scope of the present disclosure to those skilled in the art.

As used herein, the term "comprise" and variations thereof are intended to be inclusive, that is, "comprising, but not limited to". Unless otherwise stated, the term "or" indicates "and/or". The term "based on" indicates "at least partially based on". The terms "an example embodiment" and "an embodiment" indicate "at least one example embodiment". The term "another embodiment" indicates "at least one other embodiment". The terms "first", "second", and the like may refer to different or same objects. Other explicit and implicit definitions may be included below.

As described above in Background Section, after each new version of a mobile application is released, data analysis on the released "latest version" of the mobile application is required so that the overall performance, experience and other product effects of the "latest version" can be accurately evaluated. The traditional mobile application data evaluation is mainly performed in two manners.

In the first manner, the overall effect of mixing the latest version and historical versions of the mobile application is checked. In this manner, a version identifier is added through the event tracking generated in the log, data is collected and uploaded to a distributed storage device by using a log collector, and data of the user groups of all versions is analyzed. The data analysis is performed on all versions of data to obtain effect evaluation data.

When the first manner is used, a disadvantage exists that the traffic performance of the new version is not apparent. This is because data of the latest version and historical versions are mixed together, and at the initial release stage of the new version, the amount of data of mobile devices having the new version of the mobile application installed or users using the new version is relatively small, so it is not easy to find the improvement or decline of traffic indicators brought by the release of the new version.

In the second manner, the overall effect of merely the latest version of the mobile application is checked. In this manner, similarly, a version identifier is added through the event tracking generated in the log, data is collected and uploaded to a distributed storage device by using a log collector, and data of the user group of merely the latest version is acquired from the stored data and analyzed so that evaluation data of merely the latest version is obtained.

When the second manner is used, the statistical fluctuation of data will be large, resulting in low confidence. As described above, after the new version of the mobile application is released, for different operating systems and different models of mobile devices, the mobile application is updated in different orders, so the priority of version release, the speed of version release, and the convergence rate of an increase in users are each different, which leads to the fluctuation of statistics and seriously affects the traffic evaluation. For example, it is assumed that the ratio of the amount of data or the number of users of the Android operating system in which a mobile application is installed to the amount of data or the number of users of the Apple operating system for a mobile device in which the mobile application is installed is 10:3. In practice, the application upgrade orders in the Android operating system and the Apple operating system for a mobile device are different and generally, an increase in the number of users having the Android operating system in which the mobile application is installed converges faster than an increase in the number of users having the Apple operating system for a mobile device in which the mobile application is installed. Therefore, the amounts of data or the numbers of users of the Android operating system and the Apple operating system for a mobile device in which the mobile application is installed are actually increasing, and the amount of data or the number of users of the Android operating system in which the mobile application is installed to the amount of data or the number of users of the Apple operating system for a mobile device in which the mobile application is installed approaches 10:3. For example, the ratio may be from 100:3, 80:3, 20:1 . . . , 10:1 . . . , and finally reach 10:3. However, this ratio change process may continue until the next release at which time the ratio still fails to really reach 10:3. In this case, since the proportion of the Apple operating system for a mobile device is too small, the effect evaluation data has always more reflected the performance of a mobile device installed with the Android operating system.

With the sampling object determination method provided in the embodiments of the present disclosure, data of multiple versions from the latest version to the old versions is collected so that the effect evaluation can be performed on a mobile application. Moreover, the sampling proportion can be determined according to the ratio of the number of active users, that is, the number of users of the latest version when the speed of an increase in the number of users having the mobile application upgraded to the latest version first begins to slow down, to the total number of users of the mobile application. Therefore, with the sampling object determination method in the present application, representative sampling objects that are capable of using for the performance evaluation of an application can be easily determined so that the performance change brought by the newly released version of the application can be accurately reflected by the performance evaluation of the application according to the determined sampling objects, which is not only beneficial for upgrading and improving the application by the application publisher but also beneficial for improving the user experience of the application.

Figure 1:
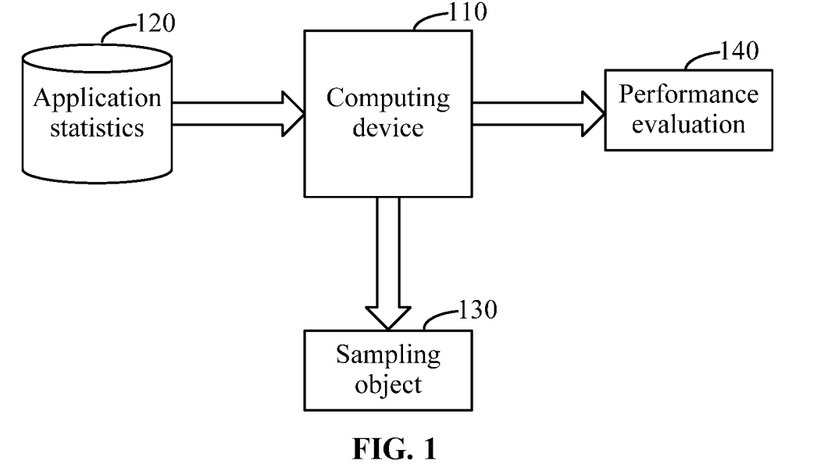
FIG. 1 illustrates a block diagram of an application evaluation environment in which a sampling object determination method according to some embodiments of the present disclosure may be implemented.

FIG. 1 illustrates a block diagram of an application evaluation environment in which a sampling object determination method according to some embodiments of the present disclosure may be implemented. According to embodiments of the present disclosure, an application evaluation environment 100 may be a cloud environment. As shown in FIG. 1, a computing device 110 is included in the application evaluation environment 100. In the application evaluation environment 100, application statistics 120 are provided for the computing device 110 as input of the computing device 110, and a sampling object 130 and a performance evaluation 140 are used as output of the computing device 110. It should be understood that embodiments of the present application are not merely applicable to mobile applications but may also be applicable to fixed applications installed on desktops. The term "application" used in embodiments of the present application may be used to refer to either a "mobile application" or a "fixed application", and this term is chosen by way of example only and is not intended to limit the scope of the present application.

The application evaluation environment 100 is merely exemplary and not limiting, the application evaluation environment 100 is extensible, more computing devices 110 may be included in the application evaluation environment 100, more application statistics 120 may be provided for the computing device 110 as the input, and the computing device 110 may also output more sample objects 130 and performance evaluations 140 so that the need for more users to simultaneously use more computing devices 110, or even more application statistics 120, to determine more sample objects 130 and performance evaluations 140 for more applications can be met. Additionally, the computing device 110 does not need to output the sampling object 130 and the performance evaluation 140 at the same time but may output merely one of the sampling object 130 or the performance evaluation 140. Furthermore, the computing device 110 may not actually output the sampling object 130 and the performance evaluation 140, but the sampling object 130 and the performance evaluation 140 are obtained merely through computing.

According to embodiments of the present disclosure, in the application evaluation environment 100, the application statistics 120 provided for the computing device 110 may include, for example, a total number of users of the application, the numbers of users of multiple versions of the application, version information of the application, proportions of the amounts of data of the application installed on different operating systems, an increase in the number of users installing the new version of the application, and the like.

According to embodiments of the present disclosure, after the application statistics 120 are received by the computing device 110 in the application evaluation environment 100, the computing device 110 may use the application statistics 120 to determine the sampling object 130 and the performance evaluation 140. The sampling object 130 includes a part of users of the application, and the performance evaluation of the application may be performed for the part of users. The performance evaluation 140 involves a performance evaluation result of the performance evaluation on the application for the sampling objects 130.

In the application evaluation environment 100 shown in FIG. 1, the input of application statistics 120 to the computing device 110 and the output of the sampling object 130 and the performance evaluation 140 from the computing device 110 may be performed over a network.

Figure 2:
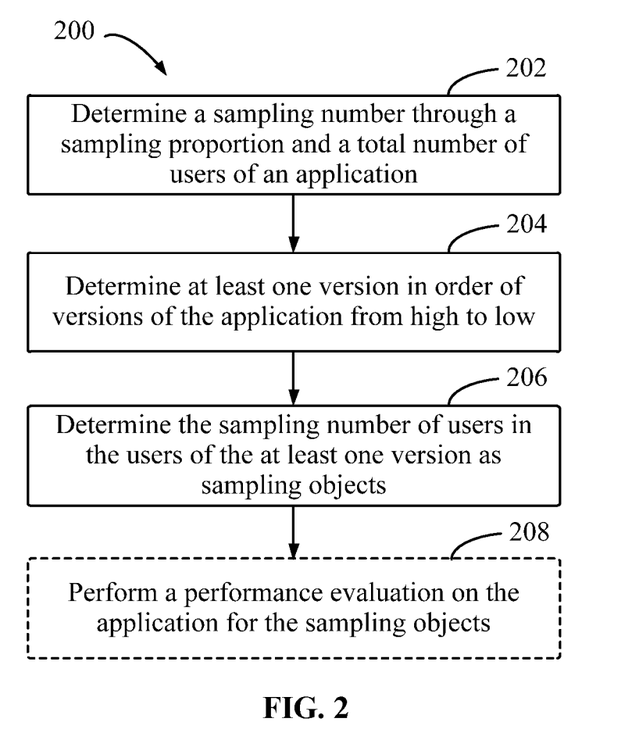
FIG. 2 illustrates a flowchart of a sampling object determination method according to an embodiment of the present disclosure.

FIG. 2 illustrates a flowchart of a sampling object determination method according to an embodiment of the present disclosure. A method 200 may be performed by the computing device 110 in the application evaluation environment 100 shown in FIG. 1. The method 200 may also include additional operations not shown and/or may omit operations shown, and the scope of the present disclosure is not limited in this respect.

In block 202, a sampling number is determined by the computing device 100 through a sampling proportion and a total number of users of an application. According to embodiments of the present disclosure, the sampling proportion may indicate how many users of all users of the application are to be sampled, and the total number of users of the application is multiplied by the sampling proportion to obtain the sampling number.

According to embodiments of the present disclosure, the sampling proportion is determined by the computing device 110 according to the total number and a number of users of a new version when the speed of an increase in a number of users of the new version first begins to slow down after the new version of the application is released.

Figure 3:
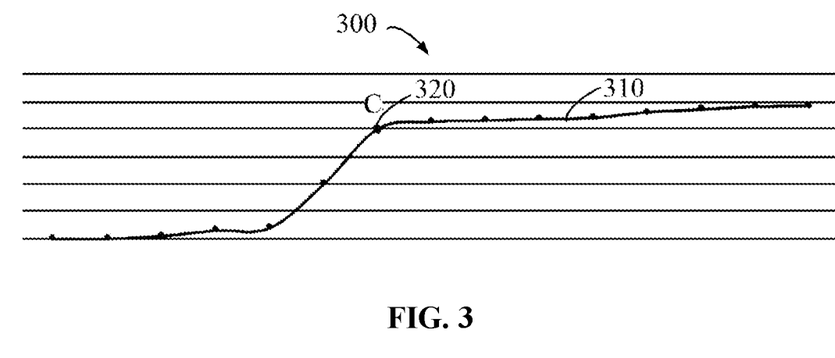
FIG. 3 illustrates a schematic diagram of an increase curve of the number of users of a new version according to an embodiment of the present disclosure.

FIG. 3 illustrates a schematic diagram of an increase curve of the number of users of a new version according to an embodiment of the present disclosure. The increase curve 300 of the number of users includes a partial curve 310 in which a first slowdown point 320 of the speed of the increase is included.

The partial curve 310 indicates an increase in the number of users of the new version of the application after the new version is released. The horizontal direction of the partial curve 310 from left to right indicates an increase in time, and the vertical direction of the partial curve 310 from bottom to top indicates the number of users having the new version installed. The partial curve 310 may be divided into three parts, that is, a left part having a smaller slope, a middle part having a larger slope, and a right part having a smaller slope. After the new version is released, the number of users having the new version installed begins to slowly increase, as shown in the left part of the partial curve 310. Then, the number of users having the new version installed rapidly increases from a time point, as shown in the middle part of the partial curve 310. The speed of the increase in the number of users having the new version installed decreases from another time point which is marked in the partial curve 310 as the first slowdown point 320 of the speed of the increase.

A user having the new version of the application installed at the first slowdown point 320 of the speed of the increase may be considered an active user. According to embodiments of the present disclosure, the number of active users may be divided by the total number of users of the application to obtain the sampling proportion. The performance evaluation on the new version of the application based on the sampling number of users obtained by using this sampling proportion can accurately reflect a performance change brought by the new version of the application. If a value greater than this sampling proportion is selected as the sampling proportion, the issue existing in the traditional technology when the first manner is used will appear. In this case, due to the greater sampling proportion, the determined sampling object involves more data of old versions. The data of old versions is quite different from evaluation data of the latest version. Thus, the traffic performance brought by the new version cannot be well reflected. If a value less than this sampling proportion is selected as the sampling proportion, the issue existing in the traditional technology when the second manner is used will appear because at the initial release stage of the new version and among users having the Android operating system, users having high-end devices usually update the application first, while users having the Apple operating system for a mobile device are just the opposite, that is, users having low-end devices update the application first. Therefore, the active user group obtained is probably merely a user group of the latest version after the upgrading. Evaluation data may be unreliable due to the influence of uneven distribution of device models.

According to embodiments of the present disclosure, when the sampling proportion is 40%, a performance evaluation performed based on the sampling number of users obtained by using this sampling ratio can most accurately reflect the performance change brought by the new version of the application.

In block 204, the computing device 110 determines at least one version in order of versions of the application from high to low. A sum of the number of users of the at least one version is greater than or equal to the sampling number determined in the step in block 202. According to embodiments of the present disclosure, data is collected for users having higher versions as far as possible among all users of the application, and the collected data can more intuitively reflect the performance change brought by the new version of the application. Thus, the sampling number of users can be determined in order of versions of the application from high to low.

According to embodiments of the present disclosure, if the number of users of the current latest version has been greater than or equal to the sampling number determined in the step in block 202, merely the current latest version and users corresponding to this current latest version need to be determined for subsequent operations; if the number of users of the current latest version is less than the sampling number determined in the step in block 202, the number of users of the current second latest version is to be counted; if the sum of the number of users of the current latest version and the number of users of the current second latest version has been greater than or equal to the sampling number determined in the step in block 202, the two versions and users corresponding to these two versions may be determined for subsequent operations; and so on.

In block 206, the computing device 110 determines the sampling number of users in the users of the at least one version determined in the step in block 204 as sampling objects. The sampling number is determined in the step in block 202.

According to an embodiment of the present disclosure, the computing device 110 may randomly determine the sampling number of users in the users of the at least one version determined in the step in block 204 as the sampling objects, and the sampling number is determined in the step in block 202. For example, the computing device 110 may arbitrarily select the sampling number of users in the users of the at least one version determined in the step in block 204 as the sampling objects, and the sampling number is determined in the step in block 202.

According to another embodiment of the present disclosure, the computing device 110 may determine a sampling coefficient through the sum of the number of users of the at least one version determined in the step in block 204 and the sampling number determined in the step in block 202 and determine the sampling number of users in the users of the at least one version determined in the step in block 204 as the sampling objects by using the determined sampling coefficient, and the sampling number is determined in the step in block 202. For example, the computing device 110 may divide the sampling number determined in the step in block 202 by the sum of the number of users of the at least one version determined in the step in block 204 to obtain the sampling coefficient, and the sampling coefficient has a value less than 1. Then, the computing device may perform sampling on the users of the at least one version determined in the step in block 204 by using the obtained sampling coefficient so as to obtain the sampling number of users as the sampling objects, and the sampling number is determined in the step in block 202.

According to another embodiment of the present disclosure, the computing device 110 may determine, in the users of the at least one version determined in the step in block 204, the sampling number of users having the highest version installed and installed longest as the sampling objects in order of versions from high to low and in order of time from long to short after a corresponding version is installed, where the sampling number is determined in the step in block 202. For example, the computing device 110 may sort the users of the at least one version determined in the step in block 204 in order of versions from high to low and in order of time from long to short after corresponding versions are installed and determine the first sampling number of users in the sequence as the sampling objects.

According to embodiments of the present disclosure, the step corresponding to block 202, the step corresponding to block 204, and the step corresponding to block 206 are performed for each type of at least two types of operating systems in which the application is installed. That is, for each type of at least two types of operating systems, the sampling number corresponding to each operating system is determined through the total number of users of each operating system in which the application is installed and the sampling proportion; at least one version is determined in order of versions of the application from high to low, and the sum of the number of users of the at least one version for each operating system is greater than or equal to the sampling number; and the sampling number of users corresponding to each operating system are determined in the users of the at least one version for each operating system as the sampling objects corresponding to each operating system.

According to embodiments of the present disclosure, the application may be installed in the at least two types of operating systems including the Android operating system and the Apple operating system for a mobile device. In this case, the step corresponding to block 202, the step corresponding to block 204, and the step corresponding to block 206 may be performed for each of these operating systems, and a set of sampling objects determined for multiple operating systems may be determined as the set of sampling objects for all operating systems in which the application is installed. Since at least two operating systems are sampled in equal proportion, the ratio between the numbers of sampling objects obtained for multiple operating systems is the same as the ratio between the total numbers of users for multiple operating systems, so that the evaluation result is not adversely affected by different version release rhythms of different operating systems.

The sampling objects capable of using for a representative performance evaluation on the application can be accurately determined through execution of the steps corresponding to block 202, block 204, and block 206.

The method 200 also includes an alternative block 208 shown in FIG. 2 in the form of a dashed block. In the alternative block 208, the computing device 110 performs the performance evaluation on the application for the sampling objects determined in block 206. For example, the performance evaluation is performed on the application based on data related to the application installed by the sampling objects determined in block 206. According to embodiments of the present disclosure, the performance evaluation on the application may include evaluating the performance such as the startup success rate of a mobile application, the startup speed of a mobile application, the white screen rate caused by a mobile application, and the rendering success rate of a mobile application.

Related contents for the application evaluation environment 100 in which the instruction execution method in some example embodiments of the present disclosure may be implemented and the sampling object determination method 200 according to embodiments of the present disclosure are described above with reference to FIGS. 1 to 3. The above description is intended to illustrate what is recorded in the present disclosure and is not intended to limit the present disclosure in any way.

The numbers of various elements and the sizes of physical quantities used in the above-mentioned drawings of the present disclosure are used by way of example only and are not intended to limit the scope of the present disclosure. The above number and size can be arbitrarily set as needed without affecting the normal implementation of the embodiments of the present disclosure.

Details of the sampling object determination method according to the embodiments of the present disclosure have been described above with reference to FIGS. 1 to 3. Multiple modules in the sampling object determination apparatus are described below with reference to FIG. 4.

Figure 4:
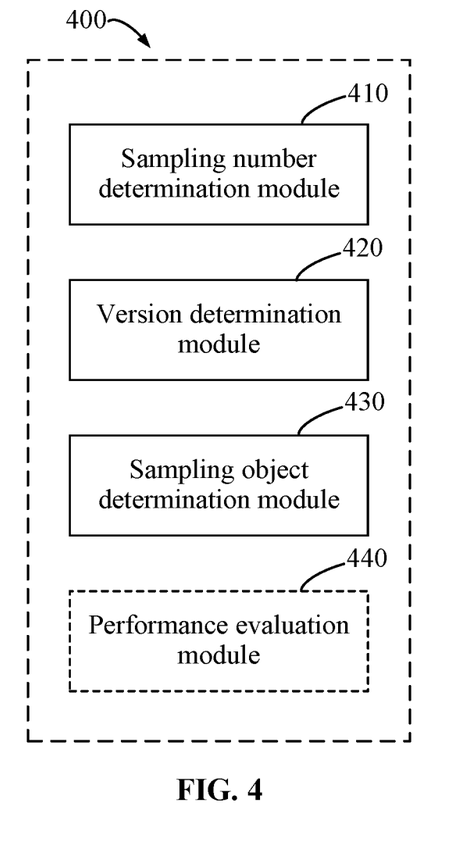
FIG. 4 illustrates a block diagram of a sampling object determination apparatus according to an embodiment of the present disclosure.

FIG. 4 illustrates a block diagram of a sampling object determination apparatus according to an embodiment of the present disclosure. As shown in FIG. 4, a sampling object determination apparatus 400 may include a sampling number determination module 410, a version determination module 420, and a sampling object determination module 430. The sampling number determination module 410 is configured to determine a sampling number through a sampling proportion and a total number of users of an application. The version determination module 420 is configured to determine at least one version in order of versions of the application from high to low, where a sum of a number of users of the at least one version is greater than or equal to the sampling number. The sampling object determination module 430 is configured to determine the sampling number of users in the users of the at least one version as sampling objects.

In some embodiments, the sampling number determination module 410, the version determination module 420, and the sampling object determination module 430 are configured to perform respective operations for each of at least two types of operating systems in which the application is installed.

In some embodiments, the sampling object determination apparatus 400 further includes a sampling proportion determination module (not shown) configured to determine the sampling proportion according to the total number and a number of users of a new version when the speed of an increase in a number of users of the new version first begins to slow down after the new version of the application is released.

In some embodiments, the sampling proportion is 40%.

In some embodiments, the sampling object determination module 430 includes a first sampling object determination module (not shown) configured to randomly determine the sampling number of users in the users of the at least one version as the sampling objects.

In some embodiments, the sampling object determination module 430 includes a sampling coefficient determination module (not shown) configured to determine a sampling coefficient through the sum of the number and the sampling number and a second sampling object determination module (not shown) configured to determine the sampling number of users in the users of the at least one version as the sampling objects by using the sampling coefficient.

In some embodiments, the sampling object determination module 430 includes a third sampling object determination module (not shown) configured to determine, in the users of the at least one version, the sampling number of users having the highest version installed and installed longest as the sampling objects in order of versions from high to low and in order of time from long to short after corresponding versions are installed.

In some embodiments, the at least two types of operating systems include the Android operating system and the Apple operating system for a mobile device.

In some embodiments, the sampling object determination apparatus 400 further includes a performance evaluation module 440 configured to perform the performance evaluation on the application for the sampling objects. The performance evaluation module 440 is configured to perform the operation corresponding to the step in the alternative block 208 in the sampling object determination method 200 and thus is illustrated in the form of dashed lines in FIG. 4 as an alternative module.

According to embodiments of the present disclosure, the present disclosure further provides an electronic device and a computer-readable storage medium.

Figure 5:
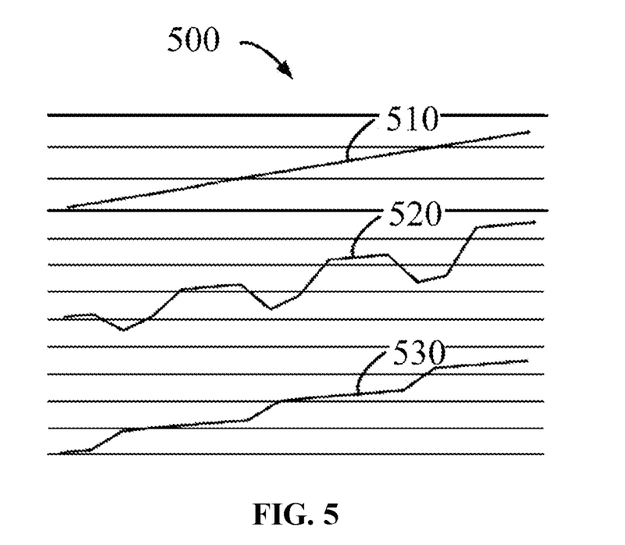
FIG. 5 illustrates a schematic diagram of an application evaluation effect curve according to an embodiment of the present disclosure.

FIG. 5 illustrates a schematic diagram of an application evaluation effect curve 500 according to an embodiment of the present disclosure. The application evaluation effect curve 500 includes a first curve 510, a second curve 520, and a third curve 530. The application evaluation effect curve 500 is illustrated by using an example in which the application is installed in two operating systems, that is, the Android operating system and the Apple operating system for a mobile device.

The first curve 510 is an evaluation curve of the overall effect of mixing the latest version and historical versions of the application performed in the first manner of the traditional scheme. Although the ratio of the number of sampled users of the Android operating system to the number of sampled users of the Apple operating system for a mobile device is the same as the ratio of the total number of users of the Android operating system to the total number of users of the Apple operating system for a mobile device, for example, the ratio is 10:3, it can be seen that the first curve 510 is too smooth to indicate the traffic performance of the latest version.

The second curve 520 is a curve of an evaluation of the latest version of the application performed in the second manner of the traditional scheme. Due to the influence of uneven distribution of device models, the ratio of the number of sampled users of the Android operating system to the number of sampled users of the Apple operating system for a mobile device is different from the ratio of the total number of users of the Android operating system to the total number of users of the Apple operating system for a mobile device, and the number of sampled users of the Android operating system is far greater than the number of sampled users of the Apple operating system for a mobile device, for example, the ratio is 12:1. Therefore, the evaluation data fluctuates greatly, and the evaluation data almost all reflect the traffic performance of the Android operating system.

The third curve 530 is a curve of an evaluation of the latest version of the application performed according to the sampling object determination method of the present application. In this case, sampling is performed on latest one or more versions. Therefore, the ratio of the number of sampled users of the Android operating system to the number of sampled users of the Apple operating system for a mobile device is the same as the ratio of the total number of users of the Android operating system to the total number of users of the Apple operating system for a mobile device, for example, the ratio is 10:3, and the third curve 530 can also accurately reflect the traffic performance brought by the latest version, such as the stepwise improvement with less fluctuation, in this manner, the evaluation data has very high confidence.

From the preceding description with reference to FIGS. 1 to 5, the technical scheme according to embodiments of the present disclosure has many advantages over the traditional schemes. For example, with the preceding technical scheme, representative sampling objects capable of using for the performance evaluation on an application may be easily determined so that the performance change brought by the newly released version of the application can be accurately reflected by the performance evaluation on the application according to the determined sampling objects, which is not only beneficial for upgrading and improving the application by the application publisher but also beneficial for improving the user experience of the application.

Figure 6:
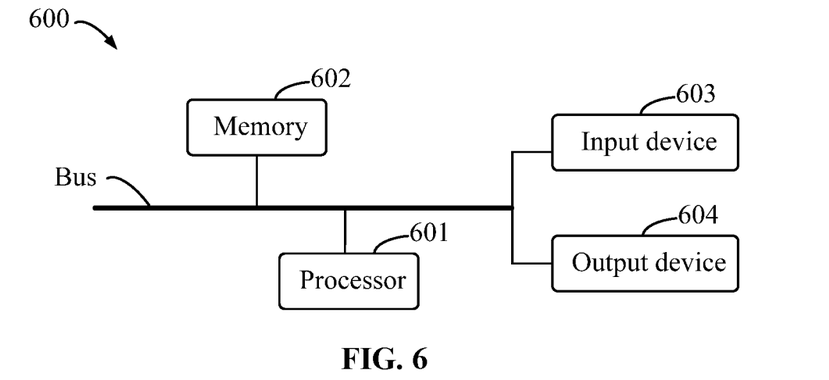
FIG. 6 illustrates a block diagram of an electronic device according to an embodiment of the present disclosure.

FIG. 6 illustrates a block diagram of an electronic device according to an embodiment of the present disclosure. For example, a computing device 120 as shown in FIG. 1 and a sampling object determination apparatus 400 as shown in FIG. 4 may be implemented by electronic devices 600. Electronic devices 600 are intended to represent various forms of digital computers, for example, laptop computers, desktop computers, worktables, personal digital assistants, servers, blade servers, mainframe computers and other applicable computers. Electronic devices may also represent various forms of mobile devices, for example, personal digital assistants, cellphones, smartphones, wearable devices and other similar computing devices. Herein the shown components, the connections and relationships between these components, and the functions of these components are illustrative only and are not intended to limit the implementation of the present disclosure as described and/or claimed herein.

As shown in FIG. 6, the electronic device 600 includes one or more processors 601, a memory 602, and interfaces for connecting various components, including a high-speed interface and a low-speed interface. The components are interconnected to each other by different buses and may be mounted on a common mainboard or in other manners as desired. A processor 601 may process instructions executed in the electronic device 600, including instructions stored in or on the memory to make graphic information of a graphical user interface (GUI) displayed on an external input/output device such as a display device coupled to an interface. In other embodiments, if required, multiple processors 601 and/or multiple buses may be used with multiple memories 602. Similarly, multiple electronic devices 600 may be connected, each providing some necessary operations (for example, a server array, a set of blade servers or a multi-processor system). FIG. 6 shows one processor 601 by way of example.

The memory 602 is the non-transitory computer-readable storage medium provided in the present disclosure. The memory stores instructions executable by at least one processor so that the at least one processor performs the sampling object determination method provided in the present disclosure. The non-transitory computer-readable storage medium of the present disclosure stores computer instructions for causing a computer to perform the sampling object determination method provided in the present disclosure.

The memory 602 as a non-transitory computer-readable storage medium is configured to store non-transitory software programs and non-transitory computer-executable programs and modules, for example, program instructions/modules corresponding to the sampling object determination method provided in embodiments of the present disclosure (for example, the sampling number determination module 410, the version determination module 420, the sampling object determination module 430, and the performance evaluation module 440 shown in FIG. 4). The processor 601 executes non-transitory software programs, instructions and modules stored in the memory 602 to execute various function applications and data processing of a server, that is, implement the sampling object determination method in the preceding method embodiments.

The memory 602 may include a program storage region and a data storage region, where the program storage region may store an operating system and an application program required by at least one function while the data storage region may store data created according to use of the electronic device 600. Additionally, the memory 602 may include a high-speed random-access memory and a non-transitory memory, for example, at least one disk memory, a flash memory or another non-transitory solid-state memory. In some embodiments, the memory 602 optionally includes memories which are remotely disposed relative to the processor 601 and these remote memories may be connected to the electronic device 600 via a network. Examples of the preceding networks include, and are not limited to, the Internet, an intranet, a local area network, a mobile communication network and a combination thereof.

The electronic device 600 may further include an input device 603 and an output device 604.

The processor 601, the memory 602, the input device 603 and the output device 604 may be connected by a bus or in other manners. FIG. 6 uses connection by a bus as an example.

The input device 603 may receive input number or character information and generate key signal input related to user settings and function control of the electronic device 600. The input device 403 may be, for example, a touchscreen, a keypad, a mouse, a trackpad, a touchpad, a pointing stick, one or more mouse buttons, a trackball or a joystick. The output device 604 may be, for example, a display device, an auxiliary lighting device (for example, a light-emitting diode (LED)) or a haptic feedback device (for example, a vibration motor). The display device may include, but is not limited to, a liquid-crystal display (LCD), an LED display, or a plasma display. In some embodiments, the display device may be a touchscreen.

The various embodiments of the systems and techniques described herein may be implemented in digital electronic circuitry, integrated circuitry, an application-specific integrated circuit (ASIC), computer hardware, firmware, software, or a combination thereof. The various embodiments may include implementations in one or more computer programs. The one or more computer programs are executable and/or interpretable on a programmable system including at least one programmable processor. The programmable processor may be a special-purpose or general-purpose programmable processor for receiving data and instructions from a memory system, at least one input device and at least one output device and transmitting data and instructions to the memory system, the at least one input device and the at least one output device.

These computing programs (also referred to as programs, software, software applications or codes) include machine instructions of a programmable processor. These computing programs may be implemented in a high-level procedural and/or object-oriented programming language and/or in an assembly/machine language. As used herein, the term "machine-readable medium" or "computer-readable medium" refers to any computer program product, device and/or apparatus (for example, a magnetic disk, an optical disk, a memory or a programmable logic device (PLD)) for providing machine instructions and/or data for a programmable processor, including a machine-readable medium for receiving machine instructions as machine-readable signals. The term "machine-readable signal" refers to any signal used in providing machine instructions and/or data for a programmable processor.

In order that interaction with a user is provided, the systems and techniques described herein may be implemented on a computer. The computer has a display device for displaying information to the user, such as a cathode-ray tube (CRT) or an LCD monitor, and a keyboard and a pointing device such as a mouse or a trackball through which the user can provide input to the computer. Other types of devices may also be used for providing interaction with a user. For example, feedback provided for the user may be sensory feedback in any form (for example, visual feedback, auditory feedback or haptic feedback). Moreover, input from the user may be received in any form (including acoustic input, voice input or haptic input).

The systems and techniques described herein may be implemented in a computing system including a back-end component (for example, a data server), a computing system including a middleware component (for example, an application server), a computing system including a front-end component (for example, a user computer having a graphical user interface or a web browser through which a user may interact with implementations of the systems and techniques described herein) or a computing system including any combination of such back-end, middleware or front-end components. The components of the system may be interconnected by any form or medium of digital data communication (for example, a communication network). Examples of the communication network include a local area network (LAN), a wide area network (WAN) and the Internet.

The computing system may include a client and a server. The client and the server are generally remote from each other and typically interact through a communication network. The relationship between the client and the server arises by virtue of computer programs running on the respective computers and having a client-server relationship with each other.

According to the technical schemes in the embodiments of the present disclosure, data of multiple versions from the latest version to the old versions may be collected so that the effect evaluation can be performed on an application. Moreover, the proportion of head users is determined according to the number of users of the latest version when the speed of an increase in the number of users having the application upgraded to the latest version first begins to slow down; and the sampling proportion is then determined. With the technical scheme, the influence brought by the release of a new version can be found flexibly and easily without being affected by the time window inconsistency and convergence speed of the release of the new version for multiple operating systems.

Various forms of the preceding flows may be used, with steps reordered, added, or removed. For example, the steps described in the present application may be executed in parallel, in sequence or in a different order as long as the desired result of the technical scheme disclosed in the present disclosure is achieved. The execution sequence of these steps is not limited herein.

What is claimed is:

1. A sampling object determination method, executed by a computing device, comprising:
    collecting users of each of versions of an application by using a log collector and uploading the users of each of the versions of the application to a distributed storage device by using the log collector;
    multiplying a sampling proportion and a total number of users of the versions of the application in the distributed storage device to obtain a sampling number;
    determining, in order of the versions of the application in the distributed storage device from new to old, whether a number of users of a first latest version of the application in the distributed storage device is greater than or equal to the sampling number; in the case where the number of users of the first latest version of the application in the distributed storage device is greater than or equal to the sampling number, determining the first latest version of the application from the versions of the application in the distributed storage device; in the case where the number of users of the first latest version of the application in the distributed storage device is less than the sampling number, determining, in the order of the versions of the application in the distributed storage device from new to old, whether a sum of the number of users of the first latest version of the application in the distributed storage device and a number of users of a second latest version of the application in the distributed storage device is greater than or equal to the sampling number; in the case where the sum of the number of users of the first latest version of the application in the distributed storage device and the number of users of the second latest version of the application in the distributed storage device is greater than or equal to the sampling number, determining the first latest version of the application and the second latest version of the application from the versions of the application in the distributed storage device; in the case where the sum of the number of users of the first latest version of the application in the distributed storage device and the number of users of the second latest version of the application in the distributed storage device is less than the sampling number, determining, in the order of the versions of the application in the distributed storage device from new to old, whether a sum of the number of users of the first latest version of the application in the distributed storage device, the number of users of the second latest version of the application in the distributed storage device, and a number of users of a third latest version of the application in the distributed storage device is greater than or equal to the sampling number, until at least one version of the application in the distributed storage device where a sum of a number of users is greater than or equal to the sampling number is determined from the versions of the application in the distributed storage device; and
    determining users whose number is the sampling number from users of the at least one version of the application in the distributed storage device where the sum of the number of users is greater than or equal to the sampling number as sampling objects;
    wherein the sampling proportion is a quotient of a number of users of the first latest version of the application in the distributed storage device when a speed of an increase in a number of users of the first latest version of the application in the distributed storage device first begins to slow down after the first latest version of the application in the distributed storage device is released divided by the total number of users of the versions of the application in the distributed storage device.

2. The sampling object determination method of claim 1, wherein the step of multiplying the sampling proportion and the total number of users of the versions of the application in the distributed storage device to obtain the sampling number, the step of determining whether the sum of the number of users of the at least one version of the application in the distributed storage device is greater than or equal to the sampling number, and the step of determining the users whose number is the sampling number from the users of the at least one version of the application in the distributed storage device where the sum of the number of users is greater than or equal to the sampling number as the sampling objects are performed for each type of at least two types of operating systems in which the application is installed.

3. The sampling object determination method of claim 2, wherein the at least two types of operating systems comprise an Android operating system and an Apple operating system for a mobile device.

4. The sampling object determination method of claim 1, further comprising:
   determining the sampling proportion according to the total number of users of the versions of the application in the distributed storage device and the number of users of the first latest version of the application in the distributed storage device when the speed of the increase in the number of users of the first latest version of the application in the distributed storage device first begins to slow down after the first latest version of the application in the distributed storage device is released.

5. The sampling object determination method of claim 1, wherein determining the users whose number is the sampling number from the users of the at least one version of the application in the distributed storage device where the sum of the number of users is greater than or equal to the sampling number as the sampling objects comprises:
   randomly determining users whose number is the sampling number from the users of the at least one version of the application in the distributed storage device where the sum of the number of users is greater than or equal to the sampling number as the sampling objects.

6. The sampling object determination method of claim 1, wherein determining the users whose number is the sampling number from the users of the at least one version of the application in the distributed storage device where the sum of the number of users is greater than or equal to the sampling number as the sampling objects comprises:
   determining a sampling coefficient through the sum of the number of users of the at least one version of the application in the distributed storage device where the sum of the number of users is greater than or equal to the sampling number; and
   determining the users whose number is the sampling number from the users of the at least one version of the application in the distributed storage device where the sum of the number of users is greater than or equal to the sampling number as the sampling objects by using the sampling coefficient.

7. The sampling object determination method of claim 1, wherein determining the users whose number is the sampling number from the users of the at least one version of the application in the distributed storage device where the sum of the number of users is greater than or equal to the sampling number as the sampling objects comprises:
   determining, from the users of the at least one version of the application in the distributed storage device where the sum of the number of users is greater than or equal to the sampling number, users whose number is the sampling number and that have a latest version of the application installed and installed longest time as the sampling objects in the order of the versions of the application in the distributed storage device from new to old and in order of time from long to short after a corresponding version of the application is installed.

8. The sampling object determination method of claim 1, further comprising:
   performing a performance evaluation on the application for the sampling objects.

9. An electronic device, comprising:
   at least one processor; and
   a memory communicatively connected to the at least one processor;
   wherein the memory stores an instruction executable by the at least one processor, and the instruction is executed by the at least one processor to cause the at least one processor to perform the following steps:
   collecting users of each of versions of an application by using a log collector and uploading the users of each of the versions of the application to a distributed storage device by using the log collector;
   multiplying a sampling proportion and a total number of users of the versions of the application in the distributed storage device to obtain a sampling number;
   determining, in order of the versions of the application in the distributed storage device from new to old, whether a number of users of a first latest version of the application in the distributed storage device is greater than or equal to the sampling number; in the case where the number of users of the first latest version of the application in the distributed storage device is greater than or equal to the sampling number, determining the first latest version of the application from the versions of the application in the distributed storage device; in the case where the number of users of the first latest version of the application in the distributed storage device is less than the sampling number, determining, in the order of the versions of the application in the distributed storage device from new to old, whether a sum of the number of users of the first latest version of the application in the distributed storage device and a number of users of a second latest version of the application in the distributed storage device is greater than or equal to the sampling number; in the case where the sum of the number of users of the first latest version of the application in the distributed storage device and the number of users of the second latest version of the application in the distributed storage device is greater than or equal to the sampling number, determining the first latest version of the application and the second latest version of the application from the versions of the application in the distributed storage device; in the case where the sum of the number of users of the first latest version of the application in the distributed storage device and the number of users of the second latest version of the application in the distributed storage device is less than the sampling number, determining, in the order of the versions of the application in the distributed storage device from new to old, whether a sum of the number of users of the first latest version of the application in the distributed storage device, the number of users of the second latest version of the application in the distributed storage device, and a number of users of a third latest version of the application in the distributed storage device is greater than or equal to the sampling number, until at least one version of the application in the distributed storage device where a sum of a number of users is greater than or equal to the sampling number is determined from the versions of the application in the distributed storage device; and
   determining users whose number is the sampling number from users of the at least one version of the application in the distributed storage device where the sum of the number of users is greater than or equal to the sampling number as sampling objects;
   wherein the sampling proportion is a quotient of a number of users of the first latest version of the application in the distributed storage device when a speed of an increase in a number of users of the first latest version of the application in the distributed storage device first begins to slow down after the first latest version of the application in the distributed storage device is released divided by the total number of users of the versions of the application in the distributed storage device.

10. The electronic device of claim 9, wherein the step of multiplying the sampling proportion and the total number of users of the versions of the application in the distributed storage device to obtain the sampling number, the step of determining whether the sum of the number of users of the at least one version of the application in the distributed storage device is greater than or equal to the sampling number, and the step of determining the users whose number is the sampling number from the users of the at least one version of the application in the distributed storage device where the sum of the number of users is greater than or equal to the sampling number as the sampling objects are performed for each type of at least two types of operating systems in which the application is installed.

11. The electronic device of claim 10, wherein the at least two types of operating systems comprise an Android operating system and an Apple operating system for a mobile device.

12. The electronic device of claim 9, wherein the instruction is executed by the at least one processor to cause the at least one processor to further perform:
determining the sampling proportion according to the total number of users of the versions of the application in the distributed storage device and the number of users of the first latest version of the application in the distributed storage device when the speed of the increase in the number of users of the first latest version of the application in the distributed storage device first begins to slow down after the first latest version of the application in the distributed storage device is released.

13. The electronic device of claim 9, wherein the instruction is executed by the at least one processor to cause the at least one processor to perform determining the users whose number is the sampling number from the users of the at least one version of the application in the distributed storage device where the sum of the number of users is greater than or equal to the sampling number as the sampling objects by:
randomly determining users whose number is the sampling number from the users of the at least one version of the application in the distributed storage device where the sum of the number of users is greater than or equal to the sampling number as the sampling objects.

14. The electronic device of claim 9, wherein the instruction is executed by the at least one processor to cause the at least one processor to perform determining the users whose number is the sampling number from the users of the at least one version of the application in the distributed storage device where the sum of the number of users is greater than or equal to the sampling number as the sampling objects by:
determining a sampling coefficient through the sum of the number of users of the at least one version of the application in the distributed storage device where the sum of the number of users is greater than or equal to the sampling number; and
determining the users whose number is the sampling number from the users of the at least one version of the application in the distributed storage device where the sum of the number of users is greater than or equal to the sampling number as the sampling objects by using the sampling coefficient.

15. The electronic device of claim 9, wherein the instruction is executed by the at least one processor to cause the at least one processor to perform determining the users whose number is the sampling number from the users of the at least one version of the application in the distributed storage device where the sum of the number of users is greater than or equal to the sampling number as the sampling objects by:
determining, from the users of the at least one version of the application in the distributed storage device where the sum of the number of users is greater than or equal to the sampling number, users whose number is the sampling number and that have a latest version of the application installed and installed longest time as the sampling objects in the order of the versions of the application in the distributed storage device from new to old and in order of time from long to short after a corresponding version of the application is installed.

16. The electronic device of claim 9, wherein the instruction is executed by the at least one processor to cause the at least one processor to further perform:
performing a performance evaluation on the application for the sampling objects.

17. A non-transitory computer-readable storage medium storing a computer instruction, wherein the computer instruction is configured to cause a computer to perform the following steps:
collecting users of each of versions of an application by using a log collector and uploading the users of each of the versions of the application to a distributed storage device by using the log collector;
multiplying a sampling proportion and a total number of users of the versions of the application in the distributed storage device to obtain a sampling number;
determining, in order of the versions of the application in the distributed storage device from new to old, whether a number of users of a first latest version of the application in the distributed storage device is greater than or equal to the sampling number; in the case where the number of users of the first latest version of the application in the distributed storage device is greater than or equal to the sampling number, determining the first latest version of the application from the versions of the application in the distributed storage device; in the case where the number of users of the first latest version of the application in the distributed storage device is less than the sampling number, determining, in the order of the versions of the application in the distributed storage device from new to old, whether a sum of the number of users of the first latest version of the application in the distributed storage device and a number of users of a second latest version of the application in the distributed storage device is greater than or equal to the sampling number; in the case where the sum of the number of users of the first latest version of the application in the distributed storage device and the number of users of the second latest version of the application in the distributed storage device is greater than or equal to the sampling number, determining the first latest version of the application and the second latest version of the application from the versions of the application in the distributed storage device; in the case where the sum of the number of users of the first latest version of the application in the distributed storage device and the number of users of the second latest version of the application in the distributed storage device is less than the sampling number, determining, in the order of the versions of the application in the distributed storage device from new to old, whether a sum of the number of users of the first latest version of the application in the distributed storage device, the number of users of the second latest version of the application in the distributed storage device, and a number of users of a third latest version of the application in the distributed storage device is greater than or equal to the sampling number, until at least one version of the application in the distributed storage device where a sum of a number of users is greater than or equal to the sampling number is determined from the versions of the application in the distributed storage device; and determining users whose number is the sampling number from users of the at least one version of the application in the distributed storage device where the sum of the number of users is greater than or equal to the sampling number as sampling objects;

wherein the sampling proportion is a quotient of a number of users of the first latest version of the application in the distributed storage device when a speed of an increase in a number of users of the first latest version of the application in the distributed storage device first begins to slow down after the first latest version of the application in the distributed storage device is released divided by the total number of users of the versions of the application in the distributed storage device.

18. The non-transitory computer-readable storage medium of claim 17, wherein the step of multiplying the sampling proportion and the total number of users of the versions of the application in the distributed storage device to obtain the sampling number, the step of determining whether the sum of the number of users of the at least one version of the application in the distributed storage device is greater than or equal to the sampling number, and the step of determining the users whose number is the sampling number from the users of the at least one version of the application in the distributed storage device where the sum of the number of users is greater than or equal to the sampling number as the sampling objects are performed for each type of at least two types of operating systems in which the application is installed.

* * * * *